(12) United States Patent
Fujita et al.

(10) Patent No.: US 6,626,549 B2
(45) Date of Patent: Sep. 30, 2003

(54) POINTER INSTRUMENT

(75) Inventors: Atsushi Fujita, Niigata (JP); Tsuyoshi Sakai, Niigata (JP); Kiyoshi Nishimura, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 10/069,066

(22) PCT Filed: Jun. 20, 2001

(86) PCT No.: PCT/JP01/05287

§ 371 (c)(1),
(2), (4) Date: Feb. 21, 2002

(87) PCT Pub. No.: WO02/03036

PCT Pub. Date: Jan. 10, 2002

(65) Prior Publication Data

US 2002/0135995 A1 Sep. 26, 2002

(30) Foreign Application Priority Data

Jun. 30, 2000 (JP) ........................................ 2000-203038

(51) Int. Cl.⁷ .............................................. G01D 11/28
(52) U.S. Cl. ............................. 362/27; 362/26; 362/30; 362/48; 362/49; 362/288; 362/330; 362/331
(58) Field of Search .............................. 362/27, 26, 30, 362/330, 331; 116/48, 49, 288

(56) References Cited

U.S. PATENT DOCUMENTS

| | | | | |
|---|---|---|---|---|
| 5,779,337 A | * | 7/1998 | Saito et al. | 362/31 |
| 6,070,549 A | * | 6/2000 | Iuchi et al. | 116/287 |
| 6,302,055 B1 | * | 10/2001 | Kalashnikov | 116/288 |
| 6,338,561 B1 | * | 1/2002 | Ikarashi | 362/26 |

FOREIGN PATENT DOCUMENTS

| | | |
|---|---|---|
| EP | 0 971 210 | 1/2000 |
| JP | 55-97595 | 12/1953 |
| JP | 1-148817 | 10/1989 |
| JP | 2-133613 | 11/1990 |
| JP | 6-20097 | 5/1994 |
| JP | 6-20099 | 5/1994 |
| JP | 8-285638 | 11/1996 |
| JP | 11-51714 | 2/1999 |
| JP | 2000-162000 | 6/2000 |

* cited by examiner

Primary Examiner—Sandra O'Shea
Assistant Examiner—Mark Tsidulko
(74) Attorney, Agent, or Firm—McDermott, Will & Emery

(57) ABSTRACT

There is provided a pointer type instrument which can reduce a light leakage to a side of a display board, and has a pointer 6 which includes an indication member 61 brightened by illumination light introduced from a back side of a rotation center region R and made of a translucent resin material, and a cover member 62 covering its outer periphery except for the back side of the rotation center region R and made of a light shielding resin material, and is driven to be rotated through a driving unit 2; a display board 3 which is disposed behind the pointer 6, is apart from the cover member 62 with a predetermined gap part S intervening, and includes a light passing part 33 corresponding to the rotation center region R; and a light source 5 disposed behind the display board 3, for generating the illumination light, wherein a leakage light prevention part 634 for suppressing a light leakage from the gap part S is provided on the back side (back side of a pedestal part 632) of the rotation center region R except for an introduction part (a light receiving part 611, a reflection part 612) of the illumination light.

5 Claims, 6 Drawing Sheets

POINTER INSTRUMENT

TECHNICAL FIELD

The present invention relates to a pointer type instrument adopted for, for example, an instrument for a vehicle, and particularly to a pointer type instrument of a type in which a pointer is brightened by lighting of a light source.

BACKGROUND OF INVENTION

Conventionally, a pointer type instrument is known in which a pointer fitted to a rotating shaft of a driving unit formed of, for example, a stepping motor type or movable magnet type motor and interlocking with the rotating shaft to be rotated above a display board, is constituted by a translucent indication member including a light introduction part at a back side of a rotation center region, and illumination light of a light source disposed behind the display board is made incident on the light introduction part of the indication member through a light passing part of the display board, whereby the indication member (pointer) emits light brightly.

In the pointer type instrument of this kind, since the rotation center region of the indication member is covered with a light shielding cover member in which its front and periphery presents a cap shape, a light leakage from this part can be suppressed. However, the back side of the rotation center region must be exposed to introduce the illumination light. Thus, there has been a case where the illumination light leaks into a surrounding area from a gap part as a clearance between the cover member and the display board, this leakage light is reflected by the display board to produce halation, and commodity quality is damaged.

From such circumstances, as disclosed in, for example, Japanese Utility Model Publication No. 20097/1994 and as shown in FIG. 11, a pointer type instrument is proposed in which an annular light shielding ring C is provided around a light passing part B made of a through hole of a display board A as a light introduction path of illumination light, and this light shielding ring C is lapped over a cover member D, whereby the illumination light leaking into the outside from a gap part E is suppressed. Incidentally, in the drawing, reference character F designates an indication member; G, a pedestal member (covering member) for fixing the indication member (pointer) F to a rotating shaft of a driving unit; H, a light guide body for guiding the illumination light to the indication member F, F1, a light introduction part of the indication member F; and G1, an exposure part for exposing the light introduction part F1 and enabling the passing of the illumination light.

However, as described above, the conventional structure is such that the light shielding ring C and the cover member D are lapped over each other while a predetermined interval is provided, and the light leakage is suppressed, and there is a defect that in the illumination light traveling toward the side of the indication member F, the illumination light reflected by the back surface of the pedestal member G is apt to leak out from the gap portion E through a space between the light shielding ring C and the cover member D, and in this point, there is room for improvement.

The present invention has been made in view of this point, and has a primary object to provide a pointer type instrument in which a light leakage to the side of a display board is reduced and illumination quality can be raised.

DISCLOSURE OF THE INVENTION

A pointer type instrument of the present invention comprises a pointer which includes an indication member made of a translucent resin material and brightened by illumination light introduced from a back side of a rotation center region, and a cover member covering its outer periphery except for the back side of the rotation center region and made of a light shielding resin material, and is driven to be rotated through a driving unit formed of, for example, a stepping motor; a display board which is disposed behind the pointer, is apart from the cover member with a gap part intervening, and includes a light passing part corresponding to the rotation center region; and a light source disposed behind the display board, for generating the illumination light, wherein a leakage light prevention part for suppressing a light leakage from the gap part is provided on the back side of the rotation center region except for an introduction part of the illumination light, whereby the illumination light traveling to the gap part can be reduced, the light leakage to the outside (side of the display board) is effectively suppressed by this, and illumination quality can be raised.

The leakage light prevention part may be directly formed on the back surface of the rotation center region of the indication member. In the case where a covering member covering the back side of the rotation center region and provided with a transmission part enabling the passing of the illumination light is fitted to the pointer, the leakage light prevention part can be formed on the back surface of the covering member which becomes the introduction side of the illumination light.

As the leakage light prevention part, for example, a plurality of protrusions for blocking out the illumination light traveling toward the side of the gap part or an inclined surface for reflecting the illumination light to the side of the rotation center can be provided, and further, a crimped surface for diffusing the illumination light may be provided, and an arbitrary structure can be selected as long as it can reduce the illumination light traveling toward the gap part.

BRIEF DESCRIPTION OF THE DRAWINGS

FIGS. 1 to 3 show a first embodiment of a pointer type instrument according to the present invention, in which FIG. 1 is a front view of the pointer type instrument, FIG. 2 is a primary part sectional view taken along line A—A of FIG. 1, and FIG. 3 is a front view showing a back side of a pedestal member.

BEST MODE FOR CARRYING OUT THE INVENTION

Hereinafter, a first embodiment of the present invention will be described with reference to FIGS. 1 to 3.

Figure 1:
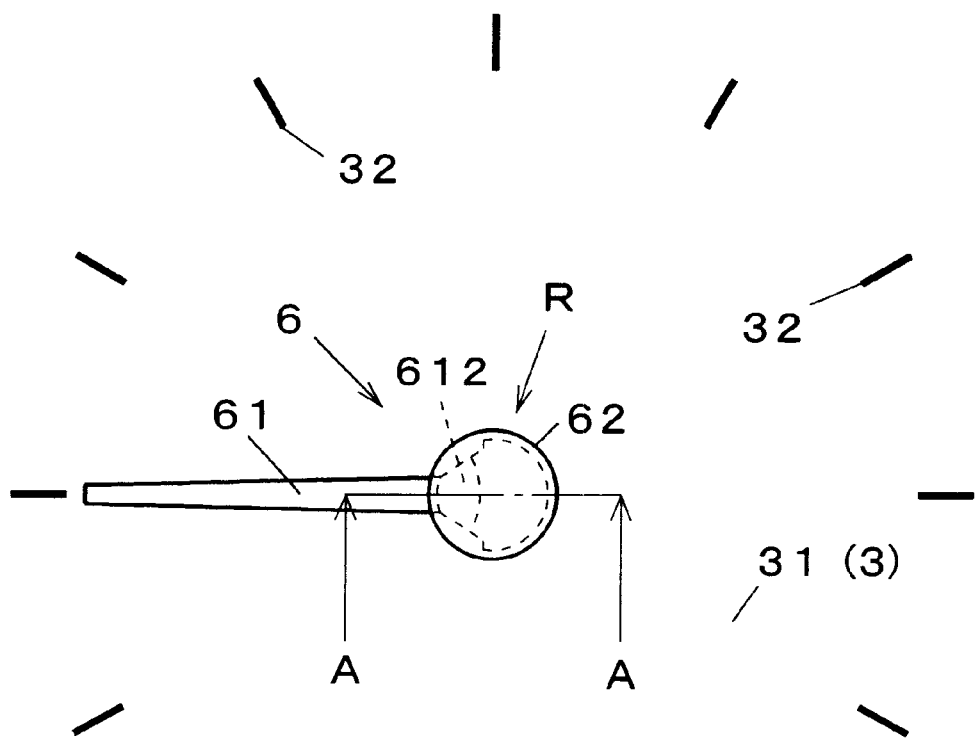
Figure 2:
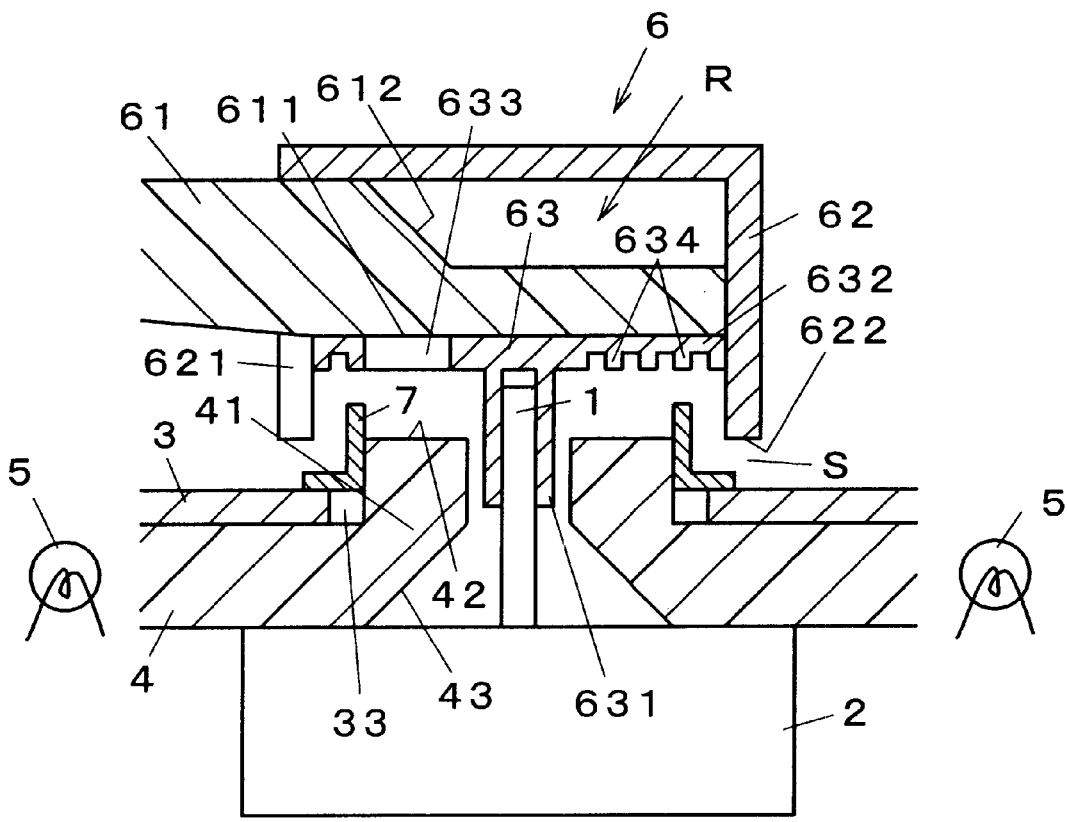

In FIGS. 1 and 2, a pointer type instrument is constituted by a driving unit 1 formed of, for example, a stepping motor type electric motor including a rotating shaft 1, a display board 3 spaced a predetermined interval apart from the driving unit 2 and disposed on its front side, a light guide body 4 disposed behind this display board 3, a light source 5, together with the light guide body 4, disposed behind the display board 3 and illuminating an after-mentioned pointer through the light guide body 4, a pointer 6 interlocking with the rotating shaft 1 of the driving unit 2 and rotating above the display board 3, and a collar member 7 disposed between the pointer 6 and the display board 3.

In the display board 3, a ground color part 31 as a background and an index part 32 as an indication object of the pointer 6 are formed by printing on a thin plate base member made of a translucent synthetic resin, and in this case, a light shielding colored ink is used for the ground color part 31, and a translucent colored ink is used for the index part 32.

Besides, at a position of the display board 3 corresponding to an after-mentioned rotation center region of the pointer 6, a light passing part 33 made of a through hole is formed which enables coupling of the pointer 6 and the rotating shaft 1 and allows illumination light from the light source 5 to pass through. Incidentally, as long as the illumination light is allowed to pass through, the light passing part 33 is not necessarily a throughhole but may be a transparent part or a semi-transparent part.

The light guide body 4 is made of a translucent synthetic resin material provided along the back surface of the display board 3, and a substantially L-shaped bent part 41 extending to the side of the pointer 6 across the light passing part 33 is formed at a place corresponding to the light passing part 33 of the display board 3.

A tip part of this bent part 41 is formed as a light outgoing end part 42 for irradiating the illumination light guided from the light source 5 to the pointer 6, and a light guide body reflection part 43 for reflecting the illumination light to the side of the light outgoing end part 42 is formed at a corner part corresponding to the light outgoing end part 42.

The pointer 6 is constituted by an indication member 61 made of a translucent synthetic resin material, a cover member 62 covering a predetermined region of this indication member 61 and made of a light shielding synthetic resin material, and a pedestal member (covering member) 63 for coupling the indication member 61 to the rotating shaft 1 and made of a light shielding synthetic resin material. Incidentally, the entire or part of the pedestal member 63 can also be formed to be translucent or semi-translucent.

The indication member 61 includes, in its rotation center region R, a light introduction part constituted by a light receiving part 611 for receiving the illumination light irradiated from the light outgoing end part 42 of the light guide body 4, and a reflection part 612 for reflecting the illumination light introduced from this light receiving part 611 toward a longitudinal direction of the indication member 61 to linearly brighten it.

The cover member 62 is formed into a cup shape opened at the back side (driving unit side) as the introduction side of the illumination light, includes a slit 621 for insertion of the indication member 61, and an opening end part 622 opposite to the board surface of the display board 3 with a gap part S intervening, and covers the front and the periphery of the indication member 61 except for its back side of the rotation center region R. Incidentally, an outer diameter of the cover member 62 in a centrifugal direction is formed to be rather larger than an inner diameter of the light passing part 33 of the display board 3.

The pedestal member 63 is constituted by a boss part 631 fixed to the rotating shaft 1, and a disk-shaped pedestal part 632, and is integrally fixed to the indication member 61 and the cover member 62 through not-shown fixing means.

In the pedestal part 632, a transmission part 633 for allowing the illumination light radiated from the light outgoing end part 42 of the light guide body 4 to pass through to the side of the light receiving part 611 is formed at a place corresponding to the light receiving part 611 of the indication member 61. At the back side (introduction side of the illumination light) of the pedestal part 632 except for the transmission part 633, a leakage light prevention part 634 is formed which reduces the illumination light traveling toward the clearance (gap part S) between the opening end part 622 of the cover member 62 and the display board 3, and suppresses the light leakage from the gap part S.

Figure 3:
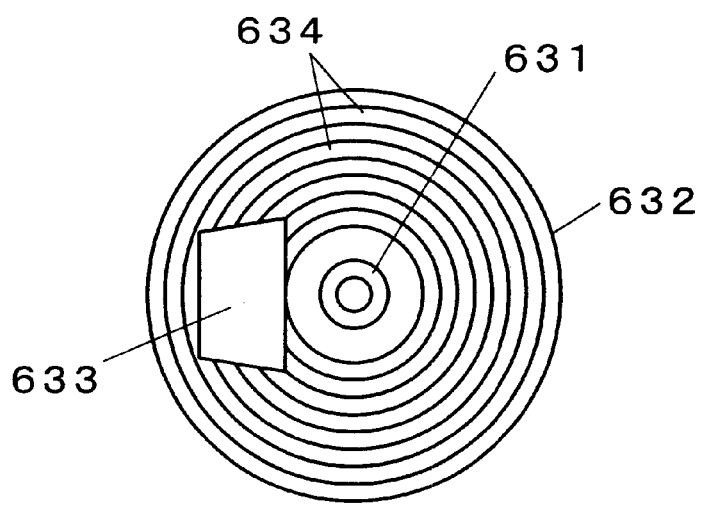

The leakage light prevention part 634 is constituted by a plurality of protrusions protruding to the side of the light passing part 33 to be spaced a predetermined interval apart, and as shown in FIG. 3, the respective protrusions are formed as a plurality of peripheral walls surrounding a rotation center (axial center of the rotating shaft 1) and having diameters gradually increasing in the direction from the rotation center to the outer periphery, and is constructed such that these peripheral walls block out the illumination light traveling toward the side of the gap part S, and can suppress the light leakage from the gap part S.

As described above, in this embodiment, there are provided the pointer 6 which includes the indication member 61 made of the translucent resin material and brightened by the illumination light introduced from the back side of the rotation center region R, and the cover member 62 covering its outer periphery except for the back side of the rotation center region R and made of the light shielding resin material, and is driven to be rotated through the driving unit 2; the display board 3 which is disposed behind the pointer 6, is apart from the cover member 62 with the gap part S intervening, and includes the light passing part 33 corresponding to the rotation center region R; and the light source 5 disposed behind the display board 3, for generating the illumination light, and the leakage light prevention part 634 for suppressing the light leakage from the gap part S is provided on the back side (back side of the pedestal part 632) of the rotation center region R except for the introduction part (the light receiving part 611, the reflection part 612) of the illumination light, whereby the illumination light traveling to the gap part S can be reduced, the light leakage to the outside (the side of the display board 3) is suppressed by this, and the illumination quality can be raised.

Besides, according to this embodiment, the leakage light prevention part 634 is constituted by the plurality of protrusions which block off the illumination light traveling toward the side of the gap part S and have convex sectional shapes, and these protrusions are formed as the peripheral walls which surround the rotation center and have the diameters gradually increasing toward the outer periphery, whereby the light leakage can be certainly suppressed over the whole area of the rotation range of the pointer 6.

Incidentally, the sizes, formation pitch and formation number of the plurality of protrusions can be suitably set in accordance with required light leakage suppression effects, specifications, and conditions, however, when a number of fine protrusions having small sizes and a small formation pitch are formed, the thickness of the pedestal part 632 can be made small while the light leakage suppression effect is raised, and this is advantageous for reducing the thickness of the pointer type instrument. Besides, in this embodiment, the collar member 7 is disposed between the pointer 6 and the display board 3, however, if a sufficient light leakage suppression effect can be obtained by the leakage light prevention part 634, it can be removed. As stated above, when the collar member 7 is removed, the distance between the pointer 6 and the display board 3 can be made small and reduction in thickness becomes possible.

Figure 4:
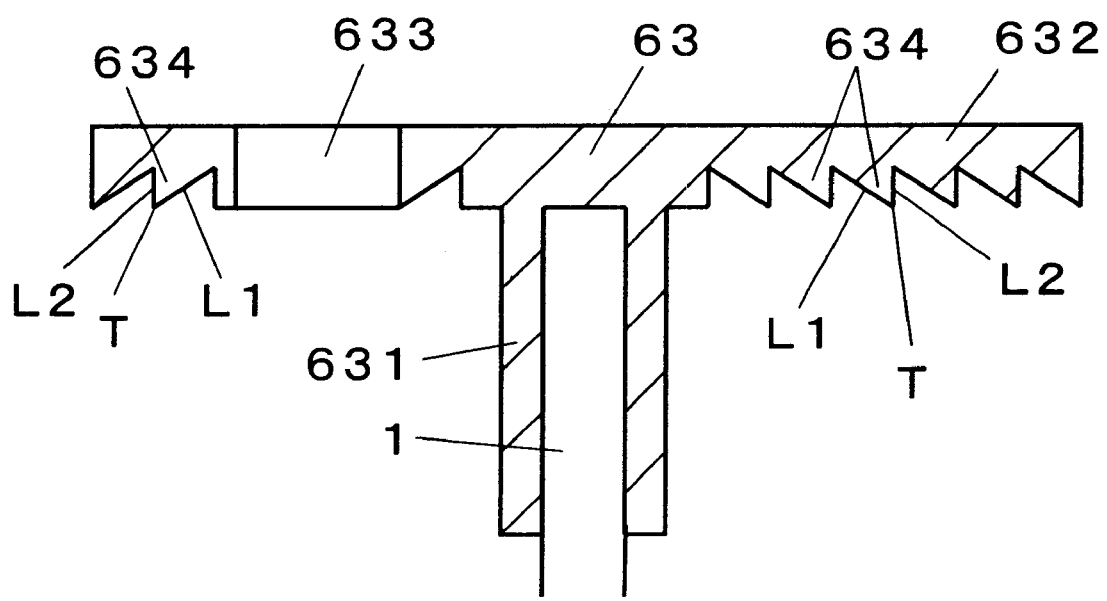
FIG. 4 is a sectional view showing a pedestal member according to a second embodiment of the present invention.

FIG. 4 is a sectional view showing a pedestal member (covering member) of a second embodiment of the present invention, which is the same as that of the first embodiment except for the structure of a leakage light prevention part 634.

That is, in this embodiment, a sectional shape of each of protrusions (leakage light prevention parts 634) formed at the back surface of a pedestal part 632 of a pedestal member 63 is formed into a substantially serrate shape which has an apex T, and a long side L1 and a short side L2 continuous with this apex T, and is tapered toward a tip. This embodiment is the same as the first embodiment in that the protrusions formed into the substantially serrate shape form peripheral walls which surround the rotation center and have diameters gradually increasing toward the outer periphery.

Besides, with respect to the long side L1 and the short side L2 intersecting each other at the apex T, the long side L1 is positioned at the side of the rotation center (inner side) and the short side L2 is positioned at the outer side, and the long side L1 is formed to be an inclined surface facing to the side of the rotation center (side of a rotating shaft 1) so that the illumination light impinging on this part is reflected to the side of the rotation center (inner side). On the other hand, the short side L2 extends substantially parallel to the axial line of the rotating shaft 1.

As described above, in this embodiment, since the sectional shape of the protrusion is formed into the substantially serrate shape, a plane part which is parallel to the board surface of the display board 3 and is apt to reflect the illumination light to the gap part S, can be lessened, and reflection of the illumination light to the side of the gap part S can be more certainly reduced by this.

Besides, in this embodiment, the sectional shape of the protrusion is formed into the substantially serrate shape having the apex T, and the long side L1 and the short side L2 continuous with the apex T, and at this time, the long side L1 is formed of the inclined surface reflecting the illumination light to the side of the rotation center, whereby the reflected light traveling to the side of the gap part S can be certainly reduced.

Figure 5:
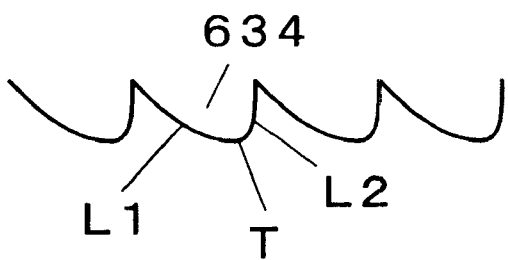
FIG. 5 is a primary part sectional view showing a third embodiment of the present invention.
Figure 6:
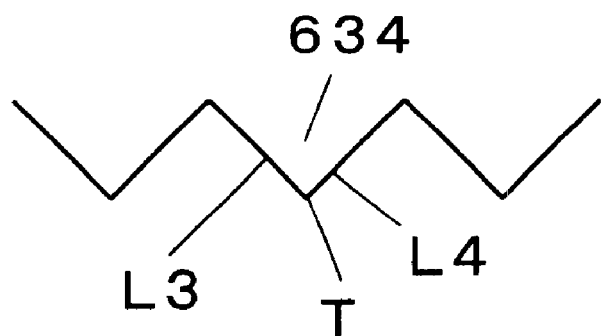
FIG. 6 is a primary part sectional view showing a fourth embodiment of the present invention.
Figure 7:
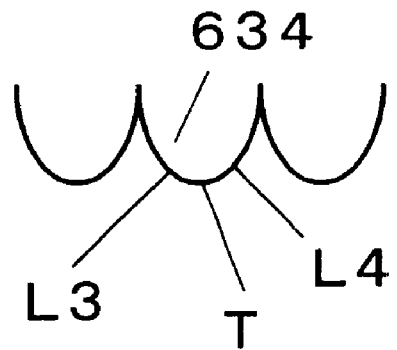
FIG. 7 is a primary part sectional view showing a fifth embodiment of the present invention.

FIGS. 5 to 7 are primary part sectional views showing modified examples of the serrate protrusions, as third to fifth embodiments of the present invention, respectively, and in the third embodiment shown in FIG. 5, a long side L1 and a short side L2 constituting a protrusion (leakage light prevention part 634) are set to be curved surfaces. In the fourth embodiment shown in FIG. 6, respective sides L3 and L4 constituting a protrusion are set to be plane surfaces equal to each other in length. Besides, in the fifth embodiment shown in FIG. 7, respective sides L3 and L4 constituting a protrusion are set to be curved surfaces equal to each other in length.

Figure 8:
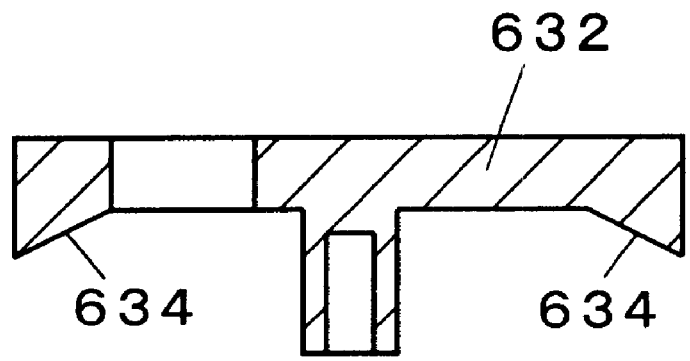
FIG. 8 is a primary part sectional view showing an eighth embodiment of the present invention.
Figure 9:
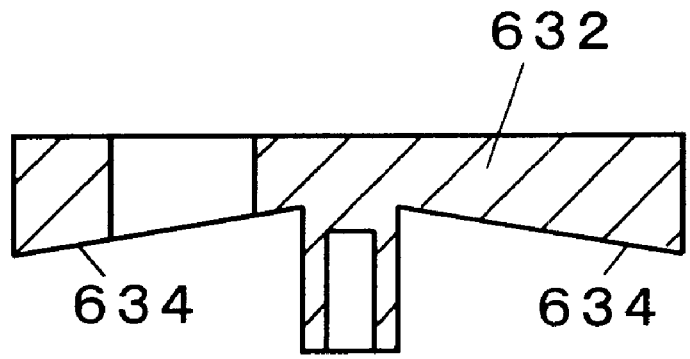
FIG. 9 is a primary part sectional view showing a seventh embodiment of the present invention.

FIGS. 8 and 9 are primary part sectional views showing other structures of a leakage light prevention part 634, as sixth and seventh embodiments. In the sixth embodiment shown in FIG. 8, a leakage light prevention part 634 is positioned at the outer peripheral part of the back surface of a pedestal part 632, and is constituted by an inclined surface inclined to the side of the rotation center so that illumination light reaching this part is reflected to the side of the rotation center. In the seventh embodiment shown in FIG. 9, a leakage light prevention part 634 is provided by inclining substantially the whole back surface of a pedestal part 632 toward the side of the rotation center.

Figure 10:
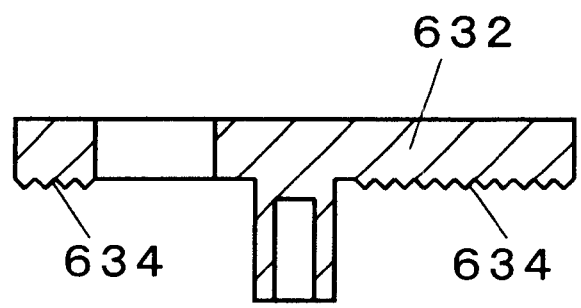
FIG. 10 is a primary part sectional view showing an eighth embodiment of the present invention.
Figure 11:
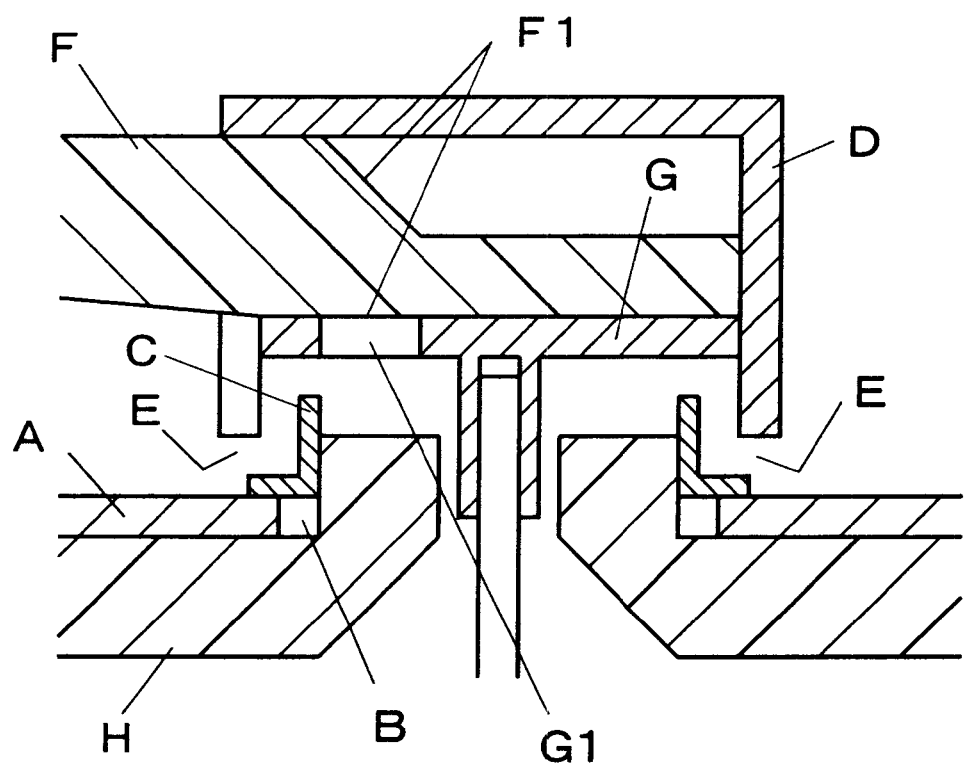
FIG. 11 is a primary part sectional view showing a conventional example.

FIG. 10 is a primary part sectional view showing another structure of a leakage light prevention part of an eighth embodiment of the present invention, and in this embodiment, the back surface of a pedestal part 632 is subjected to, for example, minute uneven working (crimp working) to provide a leakage light prevention part 634 formed of a crimped surface which diffuses and reflects the illumination light traveling to this part, and reduces the light leakage from the gap part S. Incidentally, the leakage light prevention part 634 for diffusing and reflecting the illumination light in this way may be formed on the whole region of the back surface of the pedestal part 632 except for the transmission part 633, or may be partially formed. Besides, the crimped surface may be combined with the inclined surfaces shown in FIGS. 8 and 9 or the protrusion surface of the protrusion shown in FIG. 2.

Industrial Applicability

The present invention can be applied to not only the pointer type instrument for the vehicle, but also pointer type instruments mounted on all moving bodies, for example, a ship or an aircraft.

What is claimed is:

1. A pointer type instrument comprising:
a pointer which includes a translucent indication member brightened by illumination light introduced from a back side of a rotation center region, and a light shielding cover member covering its outer periphery except for the back side of the rotation center region, and is driven to be rotated through a predetermined driving unit;
a display board which is disposed behind the pointer, is apart from the cover member with a gap part intervening, and includes a light passing part corresponding to the rotation center region; and
a light source disposed behind the display board, for generating the illumination light,
characterized in that a leakage light prevention part for suppressing a light leakage from the gap part is provided on a back surface of the rotation center region except for an introduction part of the illumination light,
wherein the leakage light prevention part includes a plurality of protrusions for blocking out the illumination light traveling toward a side of the gap part, and
wherein the protrusions are formed as peripheral wall parts to protrude toward said light passing part and to surround a rotation center.

2. A pointer type instrument comprising:
a pointer which includes a translucent indication member brightened by illumination light introduced from a back side of a rotation center region, and a light shielding cover member covering its outer periphery except for the back side of the rotation center region, and is driven to be rotated through a predetermined driving unit;
a display board which is disposed behind the pointer, is apart from the cover member with a gap part intervening, and includes a light passing part corresponding to the rotation center region;
a light source disposed behind the display board, for generating the illumination light; and a covering member covering the back side of the rotation center region, characterized in that a leakage light prevention part for suppressing a light leakage from the gap part is provided on a back surface of the covering member as an introduction side of the illumination light, wherein the leakage light prevention part includes a plurality of protrusions for blocking out the illumination light traveling toward a side of the gap part, and wherein the protrusions are formed as peripheral wall parts to protrude toward said light passing part and to surround a rotation center.

3. A pointer type instrument according to claim 2, wherein diameters of the peripheral wall parts gradually increase in a direction from the rotation center to an outer periphery.

4. A pointer type instrument according to claim 2, wherein sectional shapes of the peripheral wall parts are substantially serrate.

5. A pointer type instrument according to claim 4, wherein the sectional shape of each of the peripheral wall parts has an apex and a long side and a short side continuous with the apex, and the long side constitutes an inclined surface reflecting the illumination light to a rotation center side.

* * * * *